United States Patent [19]

Reed

[11] Patent Number: 4,682,515
[45] Date of Patent: Jul. 28, 1987

[54] GEAR TRAIN FOR FOUR RANGE HYDROMECHANICAL STEERING TRANSMISSION

[75] Inventor: Bradley O. Reed, Pittsfield, Mass.

[73] Assignee: General Electric Company, Pittsfield, Mass.

[21] Appl. No.: 659,680

[22] Filed: Oct. 11, 1984

[51] Int. Cl.⁴ .............................................. F16H 47/04
[52] U.S. Cl. ........................................ 74/687; 74/677
[58] Field of Search ............... 74/677, 682, 687, 720, 74/720.5

[56] References Cited

U.S. PATENT DOCUMENTS

| | | | |
|---|---|---|---|
| 3,538,790 | 11/1970 | Polak | 74/687 X |
| 3,596,535 | 8/1971 | Polak | 74/687 X |
| 3,815,698 | 6/1974 | Reed | 180/6.48 |
| 4,164,155 | 8/1979 | Reed et al. | 74/687 |
| 4,164,156 | 8/1979 | Rees | 74/687 |
| 4,258,585 | 3/1981 | Orshansky et al. | 74/687 |
| 4,345,488 | 8/1982 | Reed | 74/687 X |
| 4,420,991 | 12/1983 | Meyerle | 74/687 X |
| 4,485,691 | 12/1984 | Reed | 74/720 X |

Primary Examiner—Leslie Braun
Assistant Examiner—Joseph M. Rolnicki
Attorney, Agent, or Firm—Francis K. Richwine; Bailin L. Kuch

[57] ABSTRACT

An additional range device for an infinitely variable split output synchronously shifting hydromechanical steering transmission having integral steering and multiple forward ranges wherein the additional range device provides an additional different input to an existing range mechanism to drive that range mechanism in a new speed range to constitute a new higher range for the transmission.

3 Claims, 2 Drawing Figures

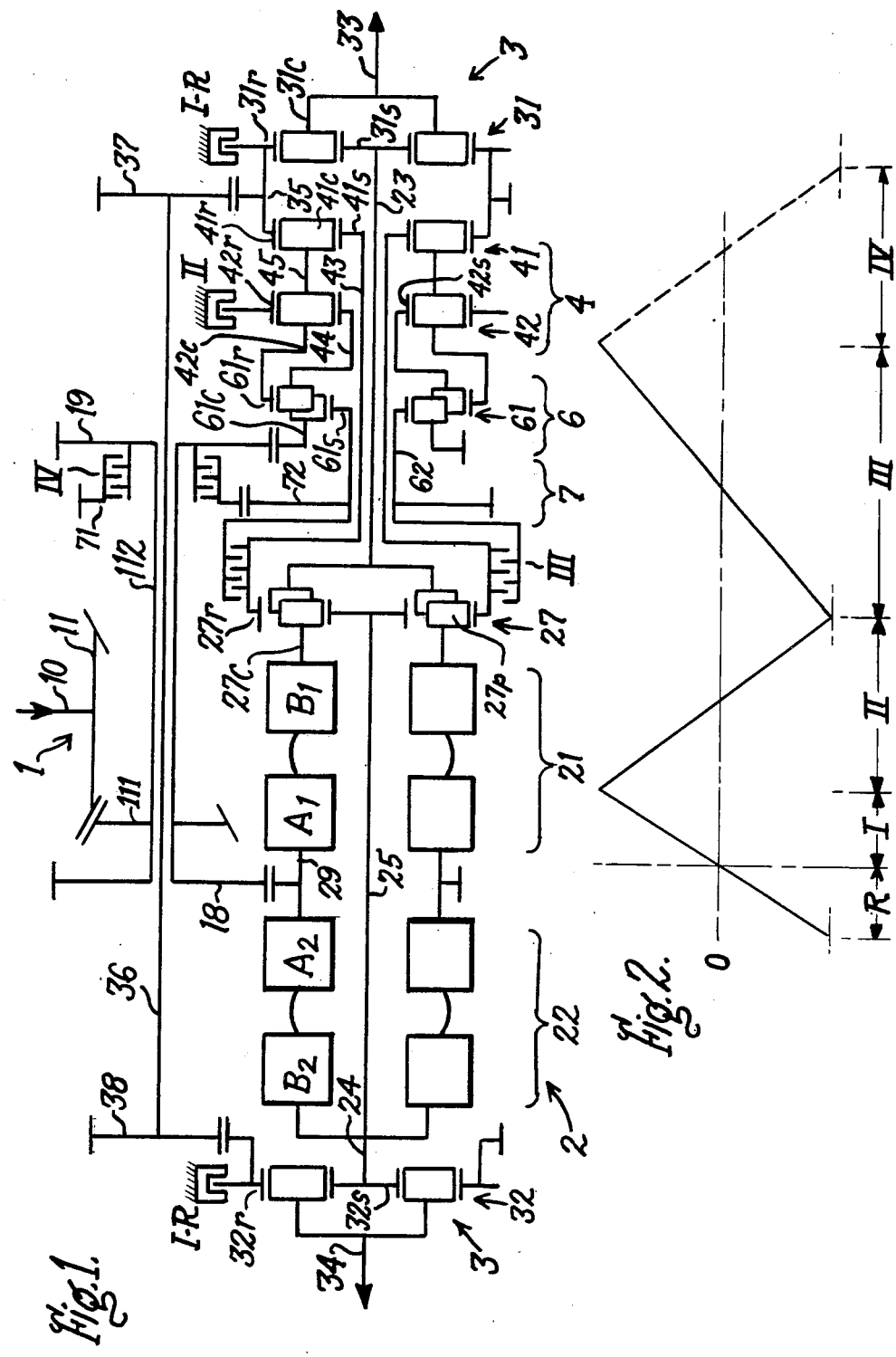

GEAR TRAIN FOR FOUR RANGE HYDROMECHANICAL STEERING TRANSMISSION

BACKGROUND OF THE INVENTION

1. Field of the Invention

This invention pertains to synchronous shifting multi-range hydromechanical steering transmissions for tracklaying or skid-steering wheeled vehicles having hydraulic components to provide continuously variable hydrostatic drive ratios and mechanical components wherein selective operation of clutches or brakes causes the transmission to operate in a plurality of distinct hydrostatic, hydromechanical or mechanical ranges; wherein steering is effected by using one or more hydrostatic devices to impose a speed difference or differential between left and right ouputs; and wherein the same hydrostatic components are used for both drive and steer as opposed to use of dedicated hydrostatic components solely to impose a difference of speed to left and right outputs to effect steering (sometimes referred to as "steer-over"). This invention pertains to that sub-class of multiple range steering transmissions which also has distinctly different speed and torque ratios in the various ranges without having steer reversal, i.e., with "steer positive" steering and without having clutches in the steer path as more fully described in my U.S. Pat. No. 4,345,488. The invention pertains most particularly to split output transmissions, defined in U.S. Pat. No. 4,345,488 as having plural power paths from input to a final power combining unit. Transmissions within the described class and sub-class vary as to the number of ranges.

2. Description of Prior Art

The most pertinent prior art is my U.S. Pat. No. 4,345,488 to which the present invention constitutes an improvement. Other art of interest as discussed in U.S. Pat. No. 4,345,488 (Reed) included the transmissions of Polak, U.S. Pat. No. 3,596,535, (an example of synchronous shifting multi-range hydromechanical steering transmissions having different speed and torque ratios in different ranges as shown by the slope of the lines in FIG. 2), Tuck, U.S. Pat. No. 3,590,658, and Polak, U.S. Pat. No. 3,538,790. My transmission disclosed in U.S. Pat. No. 3,815,698 is also pertinent, not only because it was a predecessor model to the transmission forming the subject matter of my U.S. Pat. No. 4,345,488, but also, because a four range modifification of the transmission was built and tested in which the fourth range had the same speed and torque ratios as second range which ratios were different from those of third range.

The four range modification of U.S. Pat. No. 3,815,698 was accomplished by adding a fourth range clutch to second range planetary set 28 to lock up the set so that with the clutch engaged, full input speed from gear 12 could be applied to carrier 36b as an alternative to the reduced speed applied in second range when brake D was engaged. This was according to the teaching of clutch 96 in Polak, U.S. Pat. No. 3,596,535 which is used to cause planetary set 74 of Polak to produce a second output which could be used as the basis for another range which would have a different speed range but the same torque ratio as the basic one. As noted in U.S. Pat. No. 4,345,488 with respect to the dual major axis embodiment of FIG. 4, the same four range modification of U.S. Pat. No. 3,815,698 could be applied to that dual axis model.

BRIEF SUMMARY OF INVENTION

This invention constitutes an improvement to the single major axis embodiment of the transmission of U.S. Pat. No. 4,345,488 by providing a fourth forward range which serves to extend the operating range of the transmission by the same speed range increment as that provided by second range at the relatively small cost of adding an additional clutch and a set of transfer gears. The additional gears permit the insertion of a different and alternative mechanical input speed into a set of combining gears to provide an additional range having a different speed range but the same torque ratio as the existing second range.

DESCRIPTION OF THE DRAWINGS

FIG. 1 is a schematic illustration of one of the single major axis embodiments of the invention of U.S. Pat. No. 4,345,488, modified according to this invention.

FIG. 2 is a graphic display, referred to as a stroke diagram, of a transmission according to the invention showing the relationship between the capacity of a variable displacement hydrostatic pump with the corresponding speed of its hydrostatic motor and transmission output speed and graphically portraying the improvement over the prior transmission.

DETAILED DESCRIPTION

General

Multi-range hydromechanical steering transmissions of the class can be made up of components as illustrated in FIG. 1 of the drawings wherein components of the improved transmission according to this invention include an input gear train 1, a hydrostatic first range and steer mechanism 2, output gears 3 and additional gear components 4, 6 and 7 which are used to provide three additional hydromechanical ranges. The input gear train 1 supplies power simultaneously to the hydrostatic components 21 and 22 and to the additional range gear components. The hydrostatic components using infinitely variable pump units A and motor units B can produce a hydrostatic output over a range of speed from a full forward to a full reverse. The hydrostatic output itself is directed to drive shafts through output reduction gearing 3 to constitute a first range which also provides steering by means of offsetting the capacities of the pump units A to create a difference of speed between the motor units B. The additional range gearing components 4, 6 and 7 receive input from both the input component 1 and the hydrostatic mechanism 2 and serve to generate additional inputs for, or to change inputs to the output gearing 3 to produce a plurality of hydromechanical speed ranges sequentially in excess of that produced by the hydrostatic first range. Steering in the additional range is also independent and is obtained by differential capacity settings between the hydrostatic pump units A which will cause the motor units B to produce right and left speed differences to the output gearing. This transmission which is directly derived from the embodiment illustrated in FIG. 3 of U.S. Pat. No 4,345,488 uses the average of motor or B block speeds as the hydrostatic input to the additional range gearing so as to isolate propulsion in the additional ranges from speed fluctuations which might result from the steering speed differences generated hydrostatically. Speed and torque ratios in the first three ranges are independent from each other and that of the second and third ranges are independent of steering torque as a result of the use of the B average speed as the basic hydrostatic input to the hydromechanical ranges. This transmission differs from the single major axis embodiments of FIGS. 1 and 3 of Reed U.S. Pat. No. 4,345,488 by the existence of the fourth range mechanism which is the subject matter of this invention.

A preferred embodiment

The implementation of the invention illustrated in FIG. 1 has major components located on a single major axis and has a combined first and reverse range although the input drive could be modified to constitute a full reversing transmission by use of the input gear component 1 of FIG. 1 of Reed U.S. Pat. No. 4,345,488. The major components which include the hydrostatic first, reverse and steer mechanism 2, output gearing 3, second range gear train 4, third range gear train 6 and fourth range gear train 7 are generally aligned on or rotate about the main transmission axis defined by the output shafts 33 and 34 and the center shafts 23 and 25 running through those components.

Input Gear Train

The input gear train 1 in the illustrated embodiment of the invention includes an input shaft 10 which drives bevel gear 11 in turn driving an additional bevel gear 111 which in turn drives a hollow shaft 112 and two transfer gears 18 and 19. Cross shaft 36 running through hollow shaft 112 carries cross shaft transfer gears 37 and 38 on the same minor axis as the input gears but this cross shaft location is optional, demonstrates a flexibility available for packaging considerations, and is not limiting as the cross shaft could be placed on a third axis.

Hydrostatic Steer and First Range

Although the transmission could be implemented using any compatible pair of hydrostatic pump (A) and motor (B) units 21 and 22 wherein at least the pump A has infinitely variable capacity, the best mode contemplated for implementation of this invention is by use of ball piston hydrostatic devices as disclosed and illustrated in FIGS. 2 and 3 of U.S. Pat. No. 3,814,698. Component 2 as illustrated is made up of variable capacity positive displacement ball piston pumps A1 and A2 connected to the input gear train by means of gear 29 and fixed capacity positive displacement motor units B1 and B2, each in a closed hydraulic cycle relationship with its respective hydraulic pump unit A so that the B units can be made to turn at infinitely variable speeds in either direction responsive to the rotation and capacity setting of the A units. Each of the motor units B is connected to a hydrostatic output shaft with the motor unit B2 being connected directly to shaft 24 and with the motor unit B1 being connected to shaft 23 by means of the carrier of planetary gear set 27. By varying the displacement of the pump units A, the shafts 23 and 24 can be driven at infinitely variable speeds from a maximum speed in one direction to a maximum speed in the other direction, either independently or in unison. Each of the hydrostatic output shafts 23 and 24 deliver the output speed of the hydrostatic motor B to which it is attached to the sun gear of output planetary set 31 or 32 of the output gearing 3. The elements of planetary sets, i.e., the sun, the ring, the carrier and the planetary gears, are designated with the planetary set reference number followed by the appropriate letter s, r, c or p indicating the element so that the sun gear of planetary set 31 is designated 31s. If the first range brakes indicated by I-R in FIG. 1 are activated, transmission output shafts 33 and 34 will be driven by the B units through the output planetary sets 31 and 32 at a sun to carrier reduction so that the output speed of each of the transmission output shafts in first range will bear a direct relationship to the speed of the corresponding B unit and drive the vehicle in a hydrostatic range from zero to full speed in either forward or reverse direction according to the direction of rotation and change of displacement of the pump units A to constitute a combined first and reverse range. An optional full reversing system could be implemented by use of input drive train elements used in FIG. 1 of U.S. Pat. No. 4,345,488 without departing from the unique aspects of this invention. Steering in any implementation is obtained by relative differences in the capacity settings of the pump units A with the result that the motor units B run at speeds sufficiently different from each other to produce output speed differences between shafts 33 and 34 to cause the vehicle to change direction. Steering through the use of this mechanism is infinitely variable between no steer and full pivot steer wherein pumps A1 and A2 would be stroked in opposite directions causing B1 and B2 to run, one forward, one in reverse.

Higher Ranges

Second and third ranges are provided by the gear train components indicated generally at 4 and 6 as provided in U.S. Pat. No. 4,345,488 and the new fourth range is provided by component 7. The second range component 4 is made up of the second range outer planetary set or higher range combining set 41, the second range inner planetary set or second range reduction set 42 and brake II. The third range component 6 includes third range planetary set 61, clutch III and connecting gear elements. The fourth range component 7 is a new interconnection between the B average input to the third range component and mechanical input and is made up of fourth range clutch IV and transfer gears 19, 71 and 72 to drive components 4 and 6 in additional modes to constitute the additional range. The second, third and fourth ranges are hydromechanical because there are both mechanical and hydrostatic inputs into components 4, 6 and 7 in those ranges. As noted in the summary and the general description of the invention, one distinct characteristic of a transmission according to this invention is the use of a hydrostatic input to the hydromechanical ranges which is derived from the same hydrostatic components that provide right and left speed differences for steering but which is isolated from the steer torque and speeds. This is accomplished through the use of a speed averaging device to produce the average of the B motor output speeds (i.e., "B average") for use as the hydrostatic input into the second and third range components. The speed averaging device used in the embodiment illustrated is planetary set 27. As already noted, hydrostatic motor B2 drives hydrostatic output shaft 24 directly whereas hydrostatic motor B1 drives hydrostatic output shaft 23 through the carrier 27c of planetary set 27. Because motor B1 drives carrier 27c of planetary set 27 and motor B2 drives the sun 27s of that set by means of extension shaft 25, the average of B1 and B2 speeds i.e. speed "B average" is produced on ring 27r of the planetary set. Planetary set 27 is illustrated as a double pinion planetary set, i.e., having dual pinions 27p, as a practical way to obtain the proper ratios to produce the average output desired as is the same type of planetary gear set illustrated in FIG. 4 of U.S. Pat. No. 3,815,698 and used in U.S. Pat. No. 4,345,488. While the B1 and B2 outputs are transferred directly to the transmission output sun gears to provide for steering in second, third and fourth ranges, the B average speed as generated on ring gear 27r provides the hydrostatic input to higher range propulsion without variation due to steering.

Second Range

In second range, hydrostatic input (B average) is provided on the sun 41s of outer second range or combining set 41 by hollow shaft 43 and mechanical input is provided from transfer gear 19 to the sun 42s of inner second range or reduction set 42 through the carrier 61c of set 61 and the additional concentric hollow interconnecting shaft 44 identically with the gear train of U.S. Pat. No. 4,345,488. Therefore, in the second range component 4 with mechanical input on sun 42s and with brake II engaged to immobilize ring gear 42r, a mechanical input is placed onto second range interconnecting hollow shaft 45 and carrier 41c at a sun to carrier reduction speed as produced by planetary set 42. The reduced mechanical speed on carrier 41c in combination with hydrostatic drive on sun 41s produces a resultant speed function on ring 41r which is directly conveyed to the ring gear of the output set 31 by means of gear element 35. With brake II engaged and brake I disengaged, the second range component output speed acting on ring 31r and the B1 hydrostatic output on sun 31s cooperate to produce a second range output on carrier 31c which is a function of mechanical input speed and torque, B average speed, B1 speed, hydrostatic torque and the ratios of planetary sets 42, 41 and 31.

The same second range output applied to ring 31r is also applied to ring 32r of set 32 by means of cross shaft 36 and transfer gears 37 and 38 where it is combined with B2 speed to provide an output on shaft 34 differing from that on shaft 33 only by the speed differential (or difference) used to effect steering. Cross shaft 36 is illustrated as running through hollow shaft 112 of the input gear train 1 so as to minimize the amount of space necessary for packaging of the transmission, but could be located on a separate axis.

Third Range

Third range drive is created in the third range component 6 of FIG. 1 in cooperation with second range planetary sets 41 and 42 and the third range clutch III. Hydrostatic drive is applied to the sun 61s from ring 27r by means of clutch III which is engaged to activate the third range gear train component by transferring the B average speed to hollow shaft 62 to combine that hydrostatic and the mechanical drive on carrier 61c at gear set 61 to generate an intermediate hydromechanical product on ring 61r. The intermediate hydromechanical third range product is then passed through carrier 42c of the inner second range set and hollow shaft 45 without modification to carrier 41c of the outer second range or higher range combining set where a further combination with the hydrostatic B average speed on sun 41s occurs. This combination produces the third range hydromechanical drive on ring gear 41r from which it is transferred to gear 35 and ring gears 31r and 32r. Thereafter, a further combination is made in sets 31 and 32 with the appropriate B speed to produce the third range output on transmission output shafts 33 and 34 which again is the same as the third range of the transmission of Reed U.S. Pat. No. 4,345,488. With the proper selection of gear ratios in the planetary sets, the third range can be designed to produce the desired torque ratio and speed range independently of steering and without dependence on those of other ranges except to the extent that the gear ratios of planetary sets 31 and 41 are involved in both the second and third ranges and must be compatible with both.

Fourth Range

Fourth range drive, the novel feature of this invention can be implemented by the use of fourth range component 7 in cooperation with third range component 6 to generate a constant speed mechanical input to the second range set double carrier 42c and 41c which is different from that produced in range II and which will permit a synchronous change to a higher speed range.

A characteristic of multi-range hydromechanical, synchronous shifting transmissions of this type is the cycling of the propulsive hydrostatic motor device between selected maximum speeds in each direction. Each half cycle, i.e. from one maximum to the other forming the basis of a range, with shift points occurring at the maximums, as graphically illustrated in FIG. 2. Synchronous shifts are accomplished by clutching together two elements having the same speeds at the shift point or by immobilizing an element that is stationary at the shift point to use as a reaction element. Since the output train must accelerate in the same direction beyond shift points as the hydrostatic motor device reverses acceleration, elements of the drive train are often used in the same mode in alternate ranges, e.g. ranges II and IV. The transmission designer seeks maximum utilization of drive train elements to save size and weight and, as a corollary, to produce additional ranges with the same components. In some instances, a new range by additional use of a lower range mechanism is readily available, even if not readily apparent, if reduction gearing has been used in a range mechanism. This is particularly true when a lower range in which the hydrostatic motor device is on the same cycle is available for reuse in a higher speed range. That was the situation in the four range modification to the predecessor transmissions of U.S. Pat. No. 4,345,488 (dual axis) and U.S. Pat. No. 3,815,698 and in Polak U.S. Pat. No. 3,596,535 where, in each case, a planetary set used once for the insertion of an input drive with sun to carrier reduction could be used to insert the original input without reduction.

In the present case, even though a fourth range was desired and range II used reduction gearing, i.e. sun to carrier reduction in the inside second range set 42, there was no way to lock up the reduction set 42 to drive common carrier 42c and 41c at mechanical input speed since the elements of set 42 had different speeds when the transmission was running near the maximum speed in range II, i.e. the required shift point. Therefore, second range component 4 could be used to create a range IV only if another way were found to drive common carrier 45 mechanically at a proper speed starting with a synchronous shift from range III. It was determined that if ring gear 61r of third range component could be maintained at its speed corresponding to maximum third range speed while sun 41s was cycled from its maximum third range speed (in one direction) to a new maximum (in the other direction) in a fourth range responsive to an additional hydrostatic motor drive cycle, the output train elements 35, 31r and 33 accelerate to produce a new transmission final output speed.

The result therefore is an additional hydromechanical range, range IV, having the same torque characteristics as range II but having a different speed range because the second range II constant mechanical speed input to set 41 where it is combined with B average hydrostatic output is different from the higher fourth range constant speed also derived from shaft 112 speed. The second range constant mechanical speed is the mechanical speed from shaft 112 and gear 19 as reduced by the sun to carrier reduction taken in inside second range set 42 when brake II is engaged whereas the fourth range constant mechanical speed is only slightly different from the mechanical speed used in range II prior to its reduction. The fourth range component 7 includes a gear 71 arranged to be driven by gear 19 when clutch IV is activated and gear 72 interconnecting gear 71 and shaft 62 so that when clutch IV is engaged, sun 61s is driven mechanically from shaft 112 at a predetermined constant speed. Since third range carrier is also being driven mechanically at a different speed by gear 19, the two inputs combine to produce yet another constant mechanical speed on third set ring 61r and therefore also on second range set common carrier 45 which is relatively the average of the sun 61s and carrier 61c speeds and a higher speed than that existing during operation in second range. The gearing for component 7 as already noted must produce the same speed as B average at the III-IV shift point so that the shift can be synchronous. A way to accomplish that result was created, i.e., the invention as disclosed here. It was determined that a drive connection using transfer gears 71 and 72 could be established between the transmission mechanical input and sun 61s which would drive 61s at its speed corresponding to a speed established for shift from range III to the new range IV.

OPERATION

General

The modified transmission operates in ranges I, II and III in the same manner as the FIG. 3 implementation of the transmission disclosed in U.S. Pat. No. 4,345,488. With reference to FIG. 2 it is noted that from a neutral position, i.e. at rest with the hydrostatic pump units A set for no capacity, there is no output and transmission function is at the origin point in FIG. 2. With the I-R brakes applied to immobilize ring gears 31r and 32r, the pump units A can be "stroked" in either the forward or reverse direction to pump oil to the motor units B to cause them to rotate in either the reverse or forward direction as represented by the R-I line of FIG. 2 in which the ordinate represents the speed of motor unit B and the abscissa represents the transmission output speed. In the forward direction at the selected maximum speed in range I, engagement of brake II and disengagement of brakes I-R will cause the transmission components to operate along the range II line rather than the range I line as the A units are destroked in capacity and the B units slowed from the selected maximum speed at the shift point. From the I-II shift point, as suns 41s and 31s are slowed, the rings 41r and 31r are accelerated from zero speed against the driven carrier 41c to cause output carrier 31c to accelerate but to a lesser degree. More detail of range II, the II-III shift and range III can be obtained from U.S. Pat. No. 4,345,488, particularly FIG. 8 and the explanation of the operation of the single axis embodiment.

Fourth Range

Operation of the new fourth range is depicted graphically in FIG. 2 with a dashed range IV line which is parallel to the range II line, an indication that range IV has the same torque ratio as range II, but at a speed displacement. At the III-IV shift point, by virtue of the selected ratio of transfer gears 71 and 72 as already noted, clutch IV can be engaged and clutch III disengaged in a synchronous shift to provide for driving sun 61s mechanically at the speed obtained in range III at the shift point. This provides for continuing the same top of range III speed on common carrier 45 during range IV operation as a reaction point against which the slowing of sun 41s as the A units are destroked causes increases in the speeds of gear 35 and ring gears 31r and 32r and outputs 33 and 34. The transmission then operates in a new range having the torque ratio of range II but in a new speed range IV related to range III as range II is related to range I.

CONCLUSION

The novel additional mechanical input through the transfer gears 71 and 72 solves the problem of providing a new higher mechanical speed added synchronously for use by the second range components to generate another, speed displaced, output as the basis for a range IV in the single major axis embodiment of the transmission of U.S. Pat. No. 4,345,488 which provides the same performance as the previously known fourth range modification of the dual major axis model. With the available additional range, the gear ratios including the vehicle final output gears can be modified if desired to fit the overall speed range to a particular vehicle.

I claim:

1. In a synchronous shifting, multi-range, split output, hydromechanical transmission having:
    a mechanical input drive train;
    a mechanical transmission output drive;
    a variable hydrostatic component driven by said input drive train for producing a variable speed hydrostatic output;
    two power path mechanisms for transmission of power to said transmission output drive including:
        a first power path mechanism responsive to said hydrostatic component for transmitting said variable speed hydrostatic output to said transmission output drive, and
        a range change mechanism constituting the second power path mechanism of the split output transmission for causing the transmission to operate selectively through said first power path mechanism in a first range or through both said power path mechanisms in two additional ranges having torque ratios distinct from each other and from that of said first range, said range change mechanism including:
            a third range differential gear set having one element responsive to said mechanical input train so as to be driven mechanically at a constant speed and a second element responsive to said variable speed hydrostatic output to cause said third range set to produce an initial third range hydromechanical product on a third element of said third range set, a second range differential gear reduction set responsive to said first and third elements of said third range set for receipt of a mechanical input for producing a second range reduced constant mechanical speed as an initial portion of a second range product and for passing said initial third range product, and a three element higher range differential gear combining set responsive to said second range reduction set and to said variable hydrostatic component for combining either said second range reduced mechanical speed or said initial third range product with said variable speed hydrostatic output to produce a second range and a third range final product;

friction devices for selectively activating and inactivating elements of said range change mechanism to cause said transmission to operate in three distinct ranges; and output gear means constituting a part of said transmission output train for producing a transmission output responsive to inputs received from either or both of said two power path mechanisms causing said transmission to be a split output transmission;

the improvement wherein:

said range change mechanism also includes mechanical transfer means responsive to the said mechanical input drive train and activating means for selectively supplying an additional mechanical input to said second element of said third range differential gear set to drive the transmission in an additional fourth range.

2. The transmission of claim 5 wherein:

said mechanical transfer means and activating means comprises transfer gears and a fourth range clutch interconnecting said second element of said third range differential gear set and an element of said mechanical input drive train.

3. The transmission of claim 2 wherein:

the ratios of said transfer gears and said element of said mechanical input drive train are such that said second element of said third range differential gear set is driven mechanically in fourth range at the same speed as it was driven hydrostatically in third range as it arrived at the speed at which the shift to fourth range would occur.

* * * * *